Sept. 20, 1955  C. P. BOYER  2,718,288
TAKE-UP MEMBER FOR VEHICLE FLOOR ASSEMBLIES
Filed Oct. 22, 1952

INVENTOR.
CHARLES P. BOYER
BY James E. Tooney
ATTORNEY

United States Patent Office 2,718,288
Patented Sept. 20, 1955

2,718,288

TAKE-UP MEMBER FOR VEHICLE FLOOR ASSEMBLIES

Charles P. Boyer, Chicago, Ill., assignor to Kaiser Aluminum & Chemical Corporation, Oakland, Calif., a corporation of Delaware Application October 22, 1952, Serial No. 316,267

12 Claims. (Cl. 189—34)

This invention relates to load bearing panel structures. More particularly, it is concerned with providing a novel take-up section for panel assemblies, which may be incorporated in the floor structures of vehicles such as large cargo trucks, trailers, railway cars, etc., for the purposes of fitting the various panel members constituting the floor, snugly together within the cargo truck, trailer or railway car.

Various difficulties have been experienced in the past in connection with the use of panel assemblies for the floors of trailer trucks, railway cars and the like. It has not always been possible once the individual panels have been fabricated and particularly where they are made in the form of extrusions of a standard size to place the panels within the vehicle in such a way that there is always a tight fit of all elements, due to the fact that there is sometimes an adverse buildup of tolerances with respect to the overall width of the floor in the trailer truck or railway car.

In some instances the tolerances on the body of the trailer may all be on the low side, while the tolerances on the various panel floor sections or assemblies may be on the high side thereby making it virtually impossible to assemble the floor properly. With the situation reversed, the assemblage of the floor panels would produce a gap at one side thereof.

In other words, if for example, the width of the finished floor in a trailer truck instead of being 90 inches as called for in the original truck body specification, actually is 90½ inches or more and the standard prefabricated floor panel units are each 10 inches wide, the nine floor panels making up the floor structure will not fit snugly together. In this case the tolerances of the truck body would be on the high side, while those of the panels would be on the low side. On the other hand, if the truck floor when finished instead of being 90 inches wide is 89½ inches, i. e., less than that of the original truck body specification, difficulty would again be experienced in fitting the prefabricated panels of 10 inches width properly together to make the finished floor structure. In this latter event, the tolerances in the body or the truck floor width would be on the low side, while those of the panels would be on the high side.

In order to correct this situation and therefore make possible a more efficient use of various prefabricated floor panel sections and the assemblies thereof, it is proposed that a novel adjustable take-up section also be employed therewith. In this way, it is possible to utilize various prefabricated panel sections of a standard width to their utmost advantage by providing a means to compensate for the adverse build-up of tolerances, should they occur during the assembly of the panel sections in the floors of trailer trucks and the like. The novel take-up section also provides a satisfactory solution to the problem of using standard sized extruded sections, once they have been made, interchangeably in trucks, trailers, etc. having different floor widths.

Accordingly, it is an object of this invention to provide a novel adjustable take-up section for use with floor panel assemblies in trailer trucks, vehicles and the like.

It is a further object of this invention to provide a novel adjustable take-up section for use with the panel assemblies in the floors of trailer trucks and the like, which is made up of cooperating parts which can be easily fabricated and are interchangeable one with another.

It is a further object of this invention to provide a novel take-up section for use in conjunction with the floor panel assemblies of trailer trucks and the like to compensate for whatever adverse build-up of tolerances which might occur in the floor during the installation of prefabricated floor assemblies therein.

These and other objects are accomplished by providing a novel adjustable take-up section for a panel assembly comprised of a plurality of load bearing members slidably interlocked one with the other. Each of these members in turn is provided with a pair of spaced, parallel and substantially horizontal walls together with a web portion which is integral with and connects these walls together. One of these walls is provided with a shoulder member and a load bearing flange which projects away from the wall at a transverse angle thereto in spaced parallel relationship to the web portion. The other of the walls has a free end portion which is located in spaced relationship to the projecting flange on the first defined wall, whereby when the load bearing members are slidably fitted one within the other, the second defined wall provided with a free end portion on one of the load bearing members will be located in sliding engagement with the wall on the other of the load bearing members, which is provided with the shoulder element and projecting flange. It is also contemplated that the web portion of each of the members be provided with a bulbous element which is used to lock the load bearing members making up the take-up section with other load bearing members making up the rest of the floor panel assembly of the vehicle. It is further contemplated that suitable apertures be located in the respective walls of the various load bearing members in the take-up section so that when the apertures in the various walls are all aligned one with another, suitable bolts or the like may be thrust through the walls so as to lock the members together, after a predetermined adjustment of the members with respect to each other has been made.

Other objects and advantages of this invention will become more apparent from a review of the following detailed description when taken in conjunction with the appended drawings, wherein.

Figure 1:
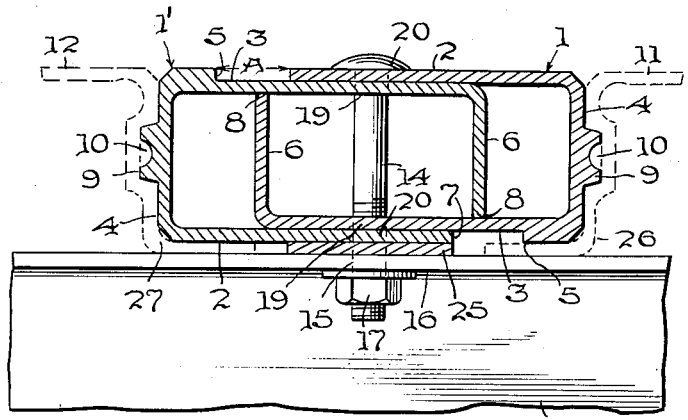
Figure 1 is a sectional view of the take-up section of the instant invention, when mounted on a suitable supporting member.
Figure 3:
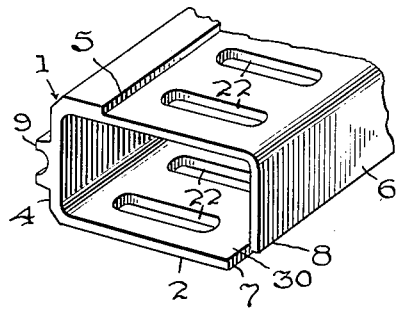
Figure 3 is a broken perspective view of a modified form of one of the load bearing members making up the take-up section shown in Figures 1 and 2.

With further reference to the drawings and particularly Figures 1 and 3, the novel take-up section employed for taking up the slack that might exist in the floor panel assemblies of trailer trucks and other like vehicles is comprised of similarly shaped, somewhat rectangular members 1 and 1', each of which includes as a part thereof, a pair of substantially horizontal and parallel walls 2 and 3 joined together by a web portion 4 formed integrally therewith.

The wall 3 of each of the load bearing members 1 and

1' is in turn provided with a shoulder portion or member 5 as clearly indicated in Figure 3. In addition, each wall 3 is provided with a weight-bearing flange 6, which flange projects away from the wall 3 at a transverse angle thereto.

Each of the walls 2 on the respective load bearing members 1 and 1' is provided with a free end portion 7 which terminates just short of the free end portion 8 on the flange 6 in the take-up section shown in Figure 1. In the case of the modified take-up section shown in Figure 4, the free end portion 7 of wall 2 projects a short distance beyond the load bearing flange 6. In addition, each of the walls or web portions 4 on the respective load bearing members 1 and 1' is provided intermediate the extremities thereof with a bulbous portion or key element 9, which is adapted to interfit with a channel shaped recessed portion 10 on the adjacent panel members 11 and/or 12, which make up the rest of the floor panel assembly.

Figure 2:
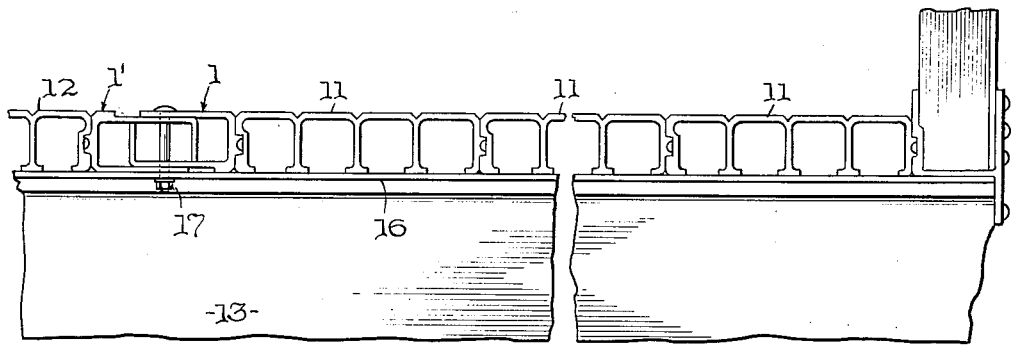
Figure 2 is a broken end view of a floor panel assembly for a trailer truck etc. with the take-up section being incorporated therein.

As indicated in Figure 2, a plurality of similarly shaped preformed panel members 11 and 12 may be utilized for the rest of the floor assembly. As indicated also in Figure 2, these panel members are also suitably locked to each other by means of similar bulbous portions located on the respective edges of the members, which slidably fit within the openings 10 on the flanges of the adjacent members. Suitable means are also provided for affixing these panel members or sections to the sides of the truck or trailer body and these sections may be of different designs as indicated in Figures 1 and 2.

These floor panels in combination with the take-up section comprised of the load bearing members 1 and 1' make up the entire floor assembly for the trailer. All of the aforesaid members including the take-up section are suitably mounted on the cross members 13, which form the primary supports for the floor structure of the truck or trailer.

It is also contemplated that suitable openings 20 and 19 be made in the parallel walls 2 and 3 respectively of the several load bearing members 1 and 1' whereby when a bolt 14 is forced through these holes and in turn through the aligned openings 15 in the supporting flange 16 on the load bearing support member 13, the take-up section can be anchored to the support member 13. Thus, when the various load bearing members 1 and 1' have been adjusted with respect to one another and the other panel members 11 and 12 making up the floor assembly, it is thus possible to hold these load bearing members securely in place by means of the bolt 14 and nut 17 after the bolt has been thrust through the aligned openings in the several walls of the load bearing members making up the take-up section and the hole 15 in the flange 16 of the supporting member 13.

It will be noted by referring to Figures 1 and 3 in an advantageous embodiment of the invention, in lieu of drilling or punching out spaced holes or openings 19 and 20 in the various walls 3 and 2 of the load bearing members 1 and 1' making up the take-up section and the opening 15 in flange 16 during which time a suitable holding and spacing tool is inserted in the open space A which exists between the shoulder portions 5 on wall 3 of one of the load bearing member and the free end portion 7 on the wall 2 of the other load bearing member, the walls 2 and 3 of the load bearing members may be provided with aligned, elongated slots 22 which have an opening of approximately the same width as the diameter of the bolt 14. In this way, it is possible to adjust the bolts 14 in a very simple manner as the various members 1 and 1' are slid one within another during the adjusting operation.

When the several load bearing members 1 and 1' are located one within the other, the inside surface of wall 2 of one of the load bearing members will be in sliding engagement with the outer surface of the wall 3 on the other member. It will be noted that at this time also, advantageous use is made of the shoulder 5 on the bearing member 1 in that it raises wall 3 of this bearing member sufficiently above wall 2 of bearing member 1' so that these walls may be brought into sliding engagement with each other. In addition, by using the supporting flanges 6 which are capable of bearing weight, it is also possible for the take-up section to be reinforced sufficiently so that it is capable of bearing a weight in addition to the other panel members which make up the floor assembly, that is, panel members 11 and 12. It will also be noted that by using the elongated slots 22 in the bearing members 1 and 1' of the take-up section, that a wide range of adjustment both in the take-up section and in the other panel members making up the floor assembly is provided for.

Figure 4:
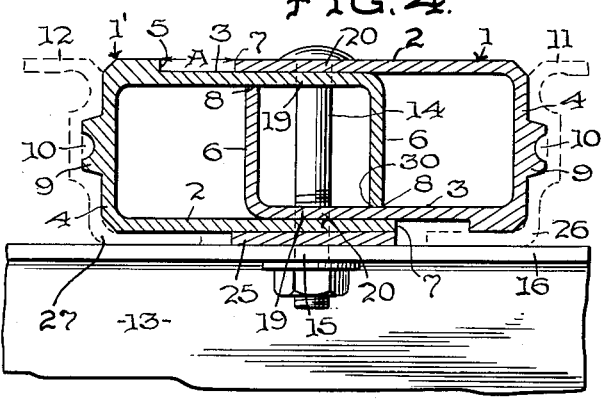
Figure 4 is a sectional view of a modified take-up section of the instant invention, when mounted on a suitable supporting member.

In another advantageous embodiment of the invention it is also contemplated that a suitable shim member 25 be located, if necessary, between the wall 2 of the load bearing member 1' of the take-up section and the supporting flange 16 of the bearing member 13 which serves as the main supporting surface for the panel assembly in the vehicle, particularly when the panel members 11 and 12 are provided with side supporting flanges 26 and 27 as indicated in Figures 1 and 4. In this way also, any openings between the take-up section and the main support 13 are compensated for and this also provides a direct contact between the take-up section consisting of load bearing members 1 and 1' and the supporting flange 16 on the main support 13 so that all loads may be transferred through the medium of the take-up section, and shim 25 directly to the support 13. This shim member 25 may also be advantageously used when the several main panel members 11 and 12 are provided with side flanges 26 and 27 that are of such a length that they do not extend completely beneath the walls 3 or 2 of the load bearing members. In this eventuality, by the utilization of such a shim, the load on the take-up section can be translated for the take-up section substantially continuously along the entire bottom thereof to the supporting flange 16 on the main support member 13.

It will be noted by referring to Figures 1 and 3, that each of the supporting members or load bearing members 1 and 1' has the same identical configuration. This is of particular advantage due to the fact that it makes them interchangeable one with another and it also provides for easy repair and maintenance.

In assembling the two load bearing members 1 and 1', all that is necessary is to fit the projecting flange 6 of one of the members through the opening 30 which exists between the free end 7 on wall 2 and the free end 8 of flange 6 on the other member, after which the members can be easily slid back and forth with respect to one another for the purposes of adjustment.

If desired, at the time that this take-up section is installed, the two parts or bearing members 1 and 1' can be spread the required amount and elongated by means of a special holding and spacing tool which as stated before, is inserted in the open space A which exists between the shoulder portion 5 on one of the load bearing members and free end portion 7 on the wall 2 of the other load bearing member. Then, while the take-up section is tightly held in this position between the panels 11 and 12 by means of the holding tool, bolts 14 may be inserted in the openings 20 and 19 drilled in walls of the various loading members and the hole 15 drilled in flange 16 of support 13. With the installation of the bolts 14, the job will be completed.

As indicated above, this take-up section may be advantageously used with various types of floor panel sections. It is also contemplated that each of the bearing members 1 and 1' be made preferably in the form of an extrusion and from lightweight materials such as aluminum or magnesium or from the alloys thereof. It is also to be noted that the flanges 6, which project from the walls 3 on each of the members, are also used to advantage in that they serve as direct supports for the surfaces of the load bearing members 1 and 1', which come into immediate contact with the loads which are placed in the floor of the vehicle. These flanges in turn then transfer the load in the manner indicated above to the flange 16 on the load bearing member 13 of the vehicle.

It will thus be seen that by the incorporation of this novel take-up section in the panel assemblies of trailers and trucks, particularly where the panels are made in the form of extrusions, a more efficient use of prefrabricated standard size panel members is made possible.

The incorporation of this novel take-up section also allows panels of standard sizes to be used in trucks having different widths and dimensions without requiring that completely new panels be made to conform with the width of the individual truck body and completely obviates the problems which now arise because of the differences in tolerances that frequently exist between the finished bodies of trucks, trailers, etc., and standard size floor panels.

An advantageous embodiment of the invention has been herein disclosed and described. It is obvious that various modifications may be made therein without departing from the spirit and scope thereof as defined by the appended claims, wherein what is claimed is:

1. An adjustable take-up section for a floor panel assembly of a vehicle and the like comprising the combination of a pair of load bearing members laterally slidably interlocked one within the other, each of said members being provided with a pair of spaced parallel walls, a web portion integral with and connecting said walls, one of said walls having a shoulder portion and a load bearing flange projecting away from said wall at a transverse angle thereto in spaced parallel relationship to said web portion and the other of said walls having a free end portion which is spaced from the said projecting flange on said first wall whereby when said load bearing members are slidably fitted one within the other, the wall on one of the load bearing members having said spaced free end portions will be in lateral sliding engagement with the wall on the other of said load bearnig members provided with said shoulder portion and said projecting flange, and means for firmly locking said load bearing members together once they have been laterally adjusted with respect to each other.

2. An adjustable take-up section for a floor panel assembly for a vehicle and the like comprising the combination of a plurality of load bearing members laterally slidably interlocked one with the other, each of said members being provided with a pair of spaced parallel walls having aligned perforations therein, a web portion integral with and connecting said walls, one of said walls having a shoulder portion and a load bearing flange projecting away from said wall at a transverse angle thereto in spaced parallel relationship to said web portion and the other of said walls having a free end portion which is spaced from said projecting flange on said first wall whereby when said load bearing members are slidably fitted one within the other the wall on one of the load bearing members having said spaced free end portion willl be located in lateral sliding engagement with the wall on the other of said load bearing members provided with said shoulder portion and said projecting flange, and a locking member projecting through the aligned openings in the walls of said load bearing members to restrict the movement of said load bearing members once they have been laterally adjusted with respect to each other.

3. An adjustable take-up section for a floor panel assembly for a vehicle and the like comprising the combination of a pair of load bearing members laterally slidably interlocked one within the other, each of said members being provided with a pair of spaced parallel walls, a web portion integral with and connecting said walls, one of said walls having a shoulder portion and a load bearing flange projecting away from said wall at a transverse angle thereto in spaced parallel relationship to said web portion and the other of said walls having a free end portion which is spaced from said projecting flange on said first defined wall whereby when said load bearing members are slidably fitted one within the other, the wall having said free end portion on one of the load bearing members will be in lateral sliding engagement with the wall on the other of said load bearing members provided with said shoulder portion, means including bulbous elements on the web portions of each of said load bearing members for locking said take-up section to the other panel members of said floor assembly, and means for firmly locking said load bearing members together once they have been laterally adjusted with respect to each other.

4. In an adjustable take-up section for a floor panel assembly of a vehicle and the like comprising the combination of a plurality of load bearing members laterally slidably interlocked one within the other, each of said members being provided with a pair of spaced parallel walls having aligned perforations therein, a web portion integral with and connecting said walls, one of said walls having a shoulder portion and a load bearing flange projecting away from said wall at a transverse angle thereto and in spaced parallel relationship to said web portion and the other of said walls having a free end portion which is spaced from said projecting flange on said first wall whereby when said load bearing members are slidably fitted one within the other, the wall having a free end portion on one of the load bearing members will be in lateral sliding engagement with the wall on the other of said load bearing members provided with said shoulder portion and said projecting flange, a locking member projecting through the aligned perforations in the walls of said load bearing members to restrict the movement of said load bearing members once they have been laterally adjusted with respect to each other, and means including bulbous elements on the web portions of said load bearing members whereby said take-up section may be locked to adjacent panel members of the said floor assembly.

5. The combination claimed in claim 4 wherein the parallel walls on at least one of the said bearing members have elongated aligned perforations therein.

6. In a vehicle body, the combination of a primary support member, a plurality of weight supporting panel members placed upon said support member and a take-up section keyed to the said panel members also located upon said primary support member, said take-up sections including a plurality of load bearing members laterally slidably interlocked one within the other, each of said load bearing members being provided with a pair of spaced parallel walls, a web portion integral with and connecting said walls, one of said walls having a shoulder portion and a load bearing flange projecting away from said wall at a transverse angle thereto and in spaced parallel relationship to said web portion and the other of said walls having a free end portion which is spaced from said projecting flange on said first defined wall whereby when said load bearing members are slidably fitted one within the other the wall having said free end portion on one of the load bearing members will be in lateral sliding engagement with the wall on the other of said load bearing members which is provided with said shoulder portion and said projecting flange, and means for locking said load bearing members against movement once they have been laterally adjusted with respect to each other.

7. The combination defined in claim 6, wherein said second defined wall on each load bearing member is provided with a free end portion which is spaced from and terminates short of the projecting flange on the first defined wall of said load bearing member.

8. The combination defined in claim 6, wherein said second defined wall on each load bearing member is provided with a free end portion which is spaced from and projects slightly beyond the projecting flange on the first defined wall of said load bearing member.

9. In a vehicle body, the combination of a main support member and a plurality of panel members mounted on said support member, a take-up section keyed to said panel members and also mounted on said support member, said take-up section including a plurality of load bearing members laterally slidably interlocked one within the other, each of said load bearing members being provided with a pair of spaced parallel walls, a web portion integral with and connecting said walls, one of said walls having a shoulder portion and a load bearing flange projecting away from said wall at a transverse angle thereto and in spaced parallel relationship to said web portion, and the other of said walls having a free end portion located in spaced relationship to said projecting flange on said first defined wall whereby when said load bearing members are slidably fitted one within the other, the wall having said free end portion on one of the load bearing members will be in lateral sliding engagement with the wall on the other of said load bearing members provided with said shoulder element and said projecting flange, a shim member interposed between said take-up section and said main support member, and means for locking said load bearing members together once they have been laterally adjusted with respect to each other.

10. In a vehicle body, the combination of a primary support member, a plurality of panel members mounted on said support member, an adjustable take-up section keyed to said panel members and also mounted upon said support member, said take-up section including a plurality of load bearing members laterally slidably interlocked one within the other, each of said load bearing members being provided with a pair of spaced parallel walls having aligned perforations therein, a web portion integral with and connecting said walls, one of said walls having a shoulder portion and a load bearing flange projecting away from said wall at a transverse angle thereto and in spaced parallel relationship to said web portion and the other of said walls having a free end portion located in spaced relationship to said projecting flange on said first wall whereby when said load bearing members are slidably fitted one within the other, the wall having said free end portion on one of the load bearing members will be in lateral sliding engagement with the wall on the other of said load bearing members which is provided with said shoulder portion and said projecting flange, and a locking member projecting through the aligned perforations in the walls of said load bearing members to restrict the movement of said load bearing members once they have been laterally adjusted with respect to each other.

11. In a vehicle body, the combination of a primary support member, a pair of spaced weight supporting panel members placed upon said support member and a take-up section located upon said primary support member and interposed between and keyed to each of said panel members, said take-up section including a pair of similarly shaped load bearing members laterally slidably interfitted one within the other, each of said load bearing members being provided with a pair of spaced similarly projecting walls, a web portion integral with and connecting said walls, one of said walls having a shoulder portion and a load bearing flange projecting away from said wall at a transverse angle thereto and in spaced parallel relationship to said web portion, the other of said walls having a free end portion which is spaced from said projecting flange on said first defined wall, whereby when said load bearing members are slidably interfitted one within the other, the wall having said free end portion on one of the load bearing members will be in lateral sliding engagement with the wall on the other of said load bearing members which is provided with said shoulder portion and said projecting flange, and means for locking said load bearing members of said take-up section against movement once they have been laterally adjusted with respect to each other.

12. An adjustable take-up section for a floor panel assembly of a vehicle and the like, comprising the combination of a pair of similarly shaped load bearing members laterally slidably interlocked one within the other, each of said members being provided with a pair of spaced similarly projecting walls, a web portion integral with and connecting said walls, one of said walls having a shoulder portion and a load bearing flange projecting away from said wall at a transverse angle thereto in spaced parallel relationship to said web portion, and the other of said walls having a free end portion which is spaced from said projecting flange on said first wall, whereby when said load bearing members are slidably fitted one within the other, the wall on one of the load bearing members having said spaced free end portion will be in lateral sliding engagement with the wall on the other of said load bearing members provided with said shoulder portion and said projecting flange, and means for firmly locking said load bearing members together once they have been laterally adjusted with respect to each other.

References Cited in the file of this patent

UNITED STATES PATENTS

| | | |
|---|---|---|
| 2,478,993 | Wing | Aug. 16, 1949 |

FOREIGN PATENTS

| | | |
|---|---|---|
| 649,309 | Great Britain | Jan. 24, 1951 |